(12) United States Patent
Van der Merwe et al.

(10) Patent No.: US 8,966,033 B2
(45) Date of Patent: Feb. 24, 2015

(54) INTEGRATED PROXIMITY ROUTING FOR CONTENT DISTRIBUTION

(75) Inventors: Jacobus Van der Merwe, New Providence, NJ (US); Seungjoon Lee, Springfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1098 days.

(21) Appl. No.: 12/542,439

(22) Filed: Aug. 17, 2009

(65) Prior Publication Data
US 2011/0040861 A1    Feb. 17, 2011

(51) Int. Cl.
*G06F 15/173*   (2006.01)
*H04L 29/08*    (2006.01)
*H04L 29/12*    (2006.01)

(52) U.S. Cl.
CPC .... *H04L 29/08729* (2013.01); *H04L 29/12066* (2013.01); *H04L 61/1511* (2013.01); *H04L 67/1002* (2013.01)
USPC ........... 709/223; 709/229; 709/228; 709/227; 709/225

(58) Field of Classification Search
CPC ............ H04L 67/1002; H04L 67/1021; H04L 67/1008
USPC ......... 709/245, 238, 229, 225, 223, 222, 200, 709/226, 227; 726/23; 455/522, 424; 370/412, 400, 396, 392, 349, 338, 265, 370/255
See application file for complete search history.

(56) References Cited

U.S. PATENT DOCUMENTS

| | | |
|---|---|---|
| 5,822,320 A | 10/1998 | Horikawa et al. |
| 6,236,652 B1 | 5/2001 | Preston et al. |
| 6,327,252 B1 | 12/2001 | Silton et al. |
| 6,415,323 B1 | 7/2002 | McCanne et al. |
| 6,687,731 B1 | 2/2004 | Kavak |
| 6,785,704 B1 | 8/2004 | McCanne |
| 6,920,129 B2 | 7/2005 | Preston et al. |
| 7,047,315 B1 | 5/2006 | Srivastava |
| 7,088,718 B1 | 8/2006 | Srivastava |
| 7,254,138 B2 | 8/2007 | Sandstrom |
| 7,254,636 B1 | 8/2007 | O'Toole et al. |
| 7,328,009 B2 | 2/2008 | Takeda et al. |
| 7,330,906 B2 | 2/2008 | Hameleers et al. |
| 7,340,505 B2 | 3/2008 | Lisiecki et al. |
| 7,343,422 B2 | 3/2008 | Garcia-Luna-Aceves et al. |
| 7,574,499 B1 | 8/2009 | Swildens et al. |

(Continued)

OTHER PUBLICATIONS

Satoshi Doi et al. "Protocol Design for Anycast Communication in IPv6 Network," Communications, Computers and Signal Processing, 2003 IEEE Pacific Rim Conference, Aug. 2003, 4 pgs.

(Continued)

*Primary Examiner* — Emmanuel L Moise
*Assistant Examiner* — Charles Murphy
(74) *Attorney, Agent, or Firm* — Akerman LLP; Michael K. Dixon; Roy P. Zachariah (57) ABSTRACT

A domain name server includes a processor configured to receive a request from a requester for an edge cache address, identify a first edge cache serving content requests to an anycast address from the requester, and determine a load of first edge cache. The processor is further configured to provide unicast address of an alternate edge cache to requester in response to the request when the load exceeds a threshold or to provide anycast address to requester in response to request when the load is below the threshold.

20 Claims, 8 Drawing Sheets

(56) References Cited

U.S. PATENT DOCUMENTS

| | | | |
|---|---|---|---|
| 7,725,596 | B2 | 5/2010 | Garcia-Luna-Aceves et al. |
| 7,734,730 | B2 | 6/2010 | McCanne |
| 7,797,426 | B1* | 9/2010 | Lyon .............................. 709/226 |
| 2002/0004846 | A1 | 1/2002 | Garcia-Luna-Aceves et al. |
| 2002/0016860 | A1 | 2/2002 | Garcia-Luna-Aceves et al. |
| 2003/0051016 | A1 | 3/2003 | Miyoshi et al. |
| 2003/0079027 | A1 | 4/2003 | Slocombe et al. |
| 2003/0105865 | A1 | 6/2003 | McCanne et al. |
| 2003/0182410 | A1 | 9/2003 | Balan et al. |
| 2003/0193958 | A1 | 10/2003 | Narayanan |
| 2004/0107234 | A1 | 6/2004 | Rajahalme |
| 2004/0143662 | A1 | 7/2004 | Poyhonen et al. |
| 2004/0146045 | A1 | 7/2004 | Jimmei et al. |
| 2004/0165565 | A1 | 8/2004 | Omae et al. |
| 2005/0010653 | A1 | 1/2005 | McCanne |
| 2005/0149531 | A1 | 7/2005 | Srivastava |
| 2005/0164729 | A1 | 7/2005 | Narayanan et al. |
| 2005/0198367 | A1 | 9/2005 | Ettikan |
| 2006/0018299 | A1 | 1/2006 | Yamamoto |
| 2006/0018317 | A1 | 1/2006 | Jimmei |
| 2006/0130064 | A1 | 6/2006 | Srivastava |
| 2006/0193252 | A1 | 8/2006 | Naseh et al. |
| 2006/0209885 | A1 | 9/2006 | Hain et al. |
| 2006/0221866 | A1 | 10/2006 | Shepherd |
| 2006/0236394 | A1 | 10/2006 | Morrow et al. |
| 2007/0088708 | A1 | 4/2007 | Vijayarajan |
| 2007/0133539 | A1 | 6/2007 | Kang et al. |
| 2007/0243821 | A1 | 10/2007 | Hundscheidt et al. |
| 2007/0261004 | A1* | 11/2007 | Swildens et al. .............. 715/811 |
| 2008/0080513 | A1* | 4/2008 | Kang et al. ..................... 370/392 |
| 2008/0123640 | A1 | 5/2008 | Bhatia et al. |
| 2008/0126529 | A1 | 5/2008 | Kim et al. |
| 2008/0235400 | A1* | 9/2008 | Slocombe et al. ............. 709/245 |
| 2009/0113057 | A1 | 4/2009 | Van der Merwe et al. |
| 2010/0131671 | A1 | 5/2010 | Kohli et al. |
| 2010/0223621 | A1* | 9/2010 | Joshi et al. ..................... 718/105 |
| 2010/0235542 | A1 | 9/2010 | Visharam et al. |
| 2011/0082916 | A1 | 4/2011 | Swanson et al. |
| 2011/0082944 | A1 | 4/2011 | Swanson et al. |
| 2011/0173345 | A1 | 7/2011 | Knox et al. |
| 2011/0246657 | A1 | 10/2011 | Glow |
| 2011/0296048 | A1 | 12/2011 | Knox et al. |
| 2012/0023198 | A1 | 1/2012 | Swanson et al. |

OTHER PUBLICATIONS

Al-Qudah, Z. et al. "Anycast-Aware Transport for Content Delivery Networks," In: WWW: ACM, 2009, ISBN 978-1-60558-487-4, 10 pgs.

J. Postel, "Request for Comments (RFC) 768: User Datagram Protocol," Aug. 28, 1980, 4 pgs.

C. Partridge et al. "Request for Comments (RFC) 1546: Host Anycasting Service," Nov. 1993, 10 pgs.

Gaurav Agarwal, Rahul Shah, and Jean Walrand, "Content Distribution Architecture Using Network Layer Anycast," In Proceedings of the IEEE workshop on Internet Applications, San Jose, CA, Jul. 2001, 9 pgs.

Hsu-Yang Kunga et al. "Efficient Multimedia Distribution Architecture Using Anycast," Computer Communications, vol. 30, Issue 2, Jan. 15, 2007, 14 pgs.

"Anycast CDNs Revisited," Hussein et al., Case Western Reserve University, Cleveland, OH, AT&T Labs—Research, Florham Park, NJ 07932, WWW 2008, Beijing, China, Apr. 21-25, 2008, pp. 277-286.

U.S. Appl. No. 12/268,744, filed Nov. 11, 2008.
U.S. Appl. No. 12/580,861, filed Oct. 16, 2009.

* cited by examiner

INTEGRATED PROXIMITY ROUTING FOR CONTENT DISTRIBUTION

FIELD OF THE DISCLOSURE

The present disclosure generally relates to communications networks, and more particularly relates to integrated proximity routing for content distribution.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
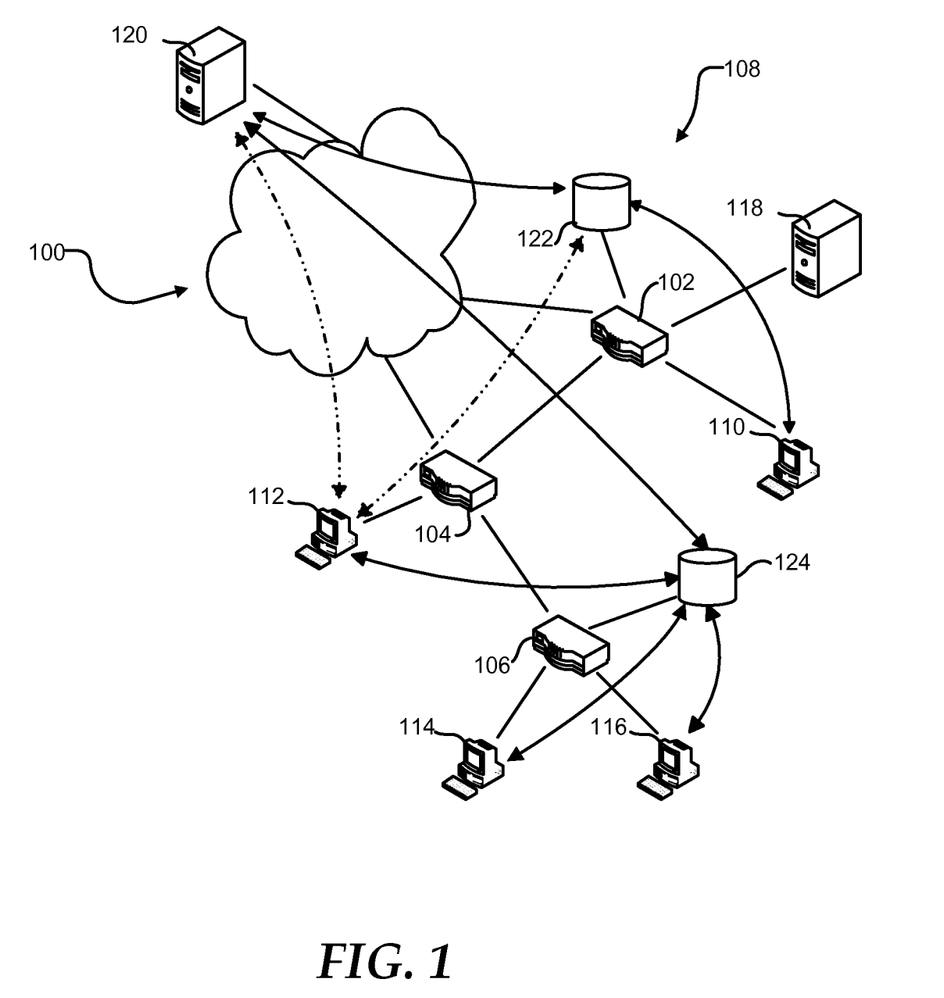
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
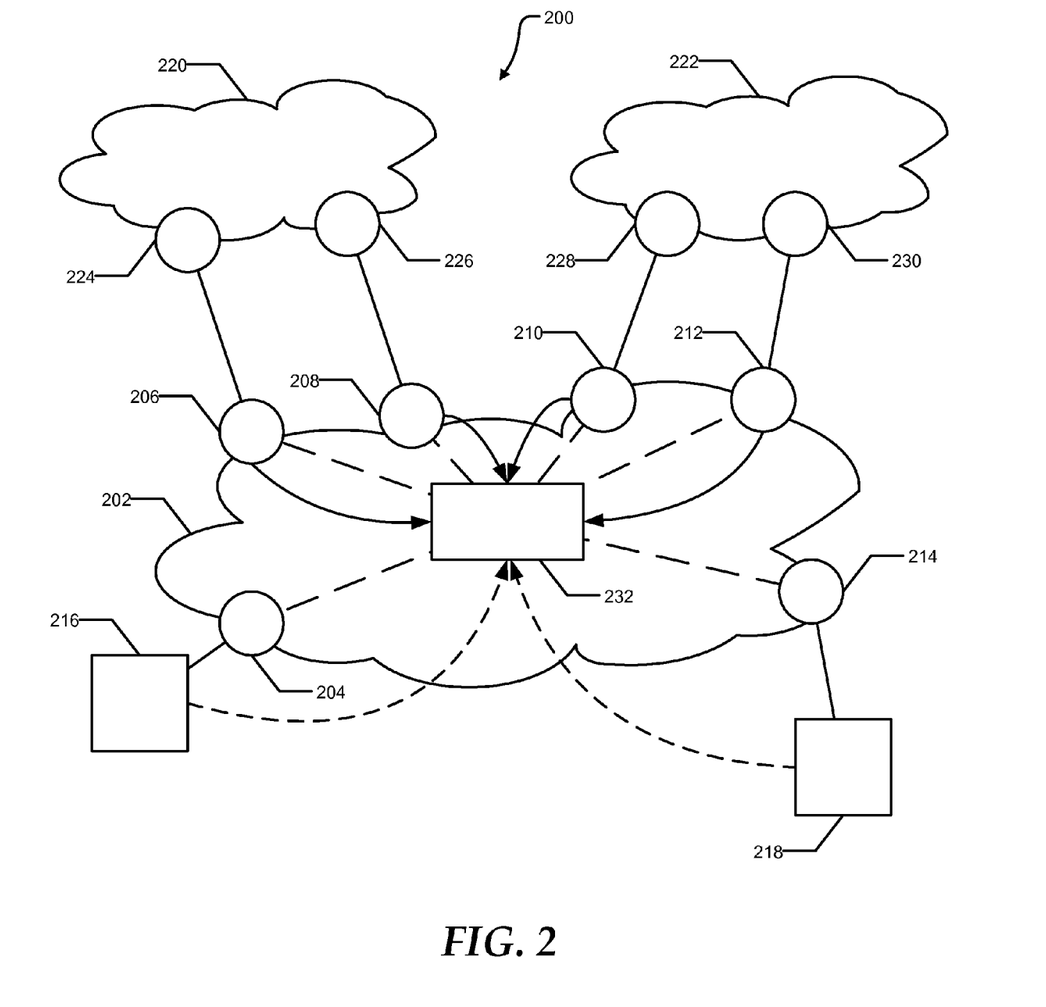
FIG. 2 is a block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204, 206, 208, 210, 212, and 214. The provider edge routers 204, 206, 208, 210, 212, and 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206, 208, 210, and 212 within the CDN provider network 202. As such, the route controller 232 can influence the routes selected by the provider edge routers 206, 208, 210, and 212. Additionally, the route controller 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206, 208, 210, and 212. Provider edge routers 206, 208, 210, and 212 can direct traffic addressed to the anycast address to either of the cache servers 216 and 218 based on the routes provided by the route controller 232. Additionally, the provider edge routers 206, 208, 210, and 212 can advertise the anycast address to AS 220 and to AS 222. The route controller 232 can manipulate the route provided to provider edge routers 206, 208, 210, and 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. Anycast traffic entering the CDN provider network 202 at provider edge router 206 may be directed to cache server 216 while anycast traffic entering at provider edge router 208 may be directed to cache server 218. Internal routing changes within AS 220 can cause traffic from a client system within AS 220 to be shifted from cache server 216 to cache server 218, resulting in disruptions to persistent and/or secure connections. As such, it is undesirable to provide an anycast addresses to client systems within an unstable network that can be subjected to frequent internal routing changes.

Figure 3:
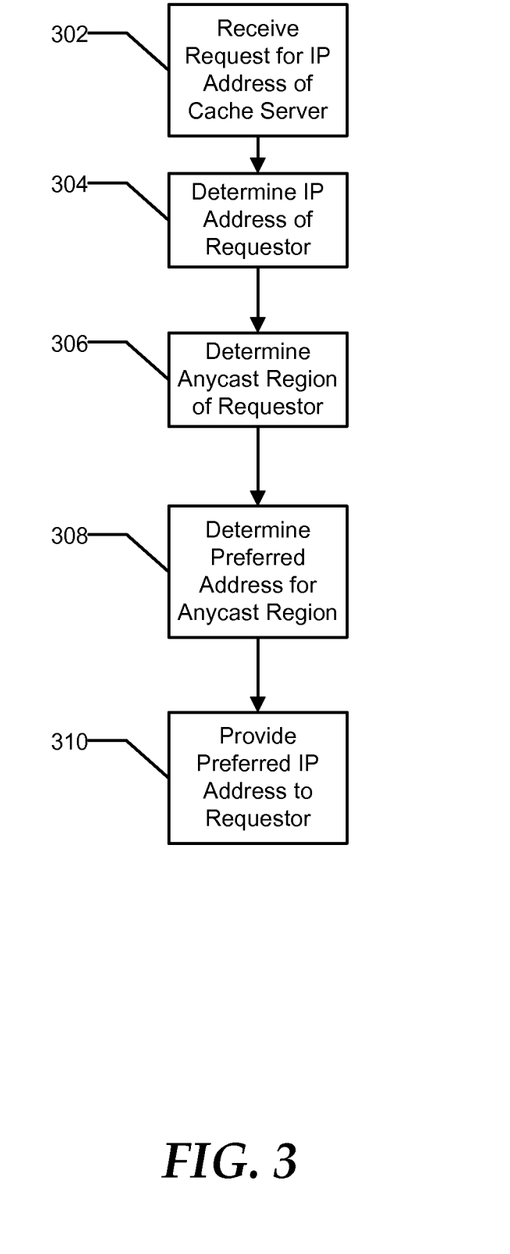
FIG. 3 is a flow diagram illustrating an exemplary method of providing an Internet Protocol (IP) address in accordance with one embodiment of the present disclosure.

FIG. 3 illustrates an exemplary method of providing an IP address in response to a DNS hostname resolution request. At 302, a system can receive a request, such as at DNS server 118, for an IP address from a requestor, such as client system 114. Alternatively, the request can be from a local DNS server. At 304, the system can determine the IP address of the requestor, such as the source IP of the request. At 306, the system can determine a serving region for the requester. In an embodiment, requestors connecting to the content delivery network through the same ingress point can belong to the same serving region. Specifically, in an anycast mode, content requests entering the content delivery network from the same ingress point can be served by the same cache server, such as cache server 122.

At 308, the system can determine a preferred IP address for the serving region, and at 310 the system can provide the preferred address to the requester. When the cache servers are not in an overloaded state, the preferred IP address can be an anycast IP address for the cache servers. Alternatively, when the cache servers are in an overloaded state, or more specifically when the cache server serving the serving region is in an overloaded state, the preferred address can be a unicast IP address directing the requests to an alternate cache server that is not in an overloaded state. In this way, the system can direct requests away from overloaded cache servers. In an embodiment, the alternate cache server can be identified based on network distance, network cost, network latency, link capacity, or any combination thereof. Further, the alternate cache server can be identified prior to the request or can be determined concurrent to the request.

Figure 4:
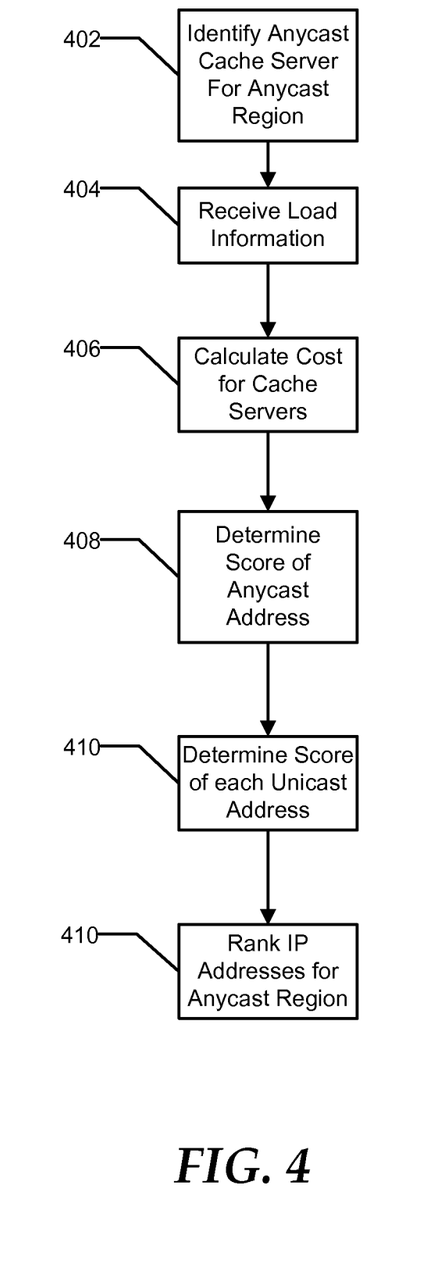
FIG. 4 is a flow diagram illustrating an exemplary method of ranking IP address in accordance with one embodiment of the present disclosure.

FIG. 4 illustrates an exemplary method of ranking IP addresses in order to provide a response to a DNS hostname resolution request. At 402, a system identifies a serving region cache server for an serving region. The serving region cache server can be the cache server that serves content requests sent to the anycast IP address from client systems within the serving region. The serving region cache server can be determined based on routing information indicating which cache server will receive content requests entering the content delivery network from a particular ingress point.

At 404, the system can determine load information for each of the cache servers within the content delivery network. The load information can include available bandwidth, bandwidth utilization, CPU utilization, memory utilization, number of requests being served, and the like. At 406, the system can determine a network cost for serving content from each of the cache servers. The network cost can be based on the network distance from the cache server to the egress point for the serving region. Additionally, the network cost can include the bandwidth and/or latency for each link on the path from the cache server to the egress point. Additionally, the system may determine a network cost associated with serving content requests sent to the anycast address.

At 408, the system can determine a score for the anycast address. The score for the anycast address can be based upon the load information for the serving region cache server and the network cost associated with serving content to the serving region from the anycast address. In an embodiment, the routing of requests can ensure that requests to the anycast address are directed to the cache server with the lowest network cost for providing content. Accordingly, a network cost component can be a fixed, minimal network cost. At 410, the system can determine a score for each unicast address of a set of unicast addresses associated with the cache servers. The score for the unicast address can be based upon the load information of the cache server associated with the unicast address and the network cost of serving content from the cache server. At 412, the system can generate a ranking of the anycast IP address and the unicast IP addresses based on the score. The ranking can be used to identify a preferred IP address for responding to a request for an IP address for a cache server. Typically, the anycast IP address can have the highest ranking when the serving region cache server is not overloaded and a unicast IP address for an alternate cache server can have the highest ranking when the serving region cache server is overloaded.

In an embodiment, the system may provide only the most preferred IP address to all requests from a serving region. Alternatively, the system may provide a set of preferred IP addresses in response to requests. Further, the IP address provided to each of a plurality of requests can be based on a weighting of the set of preferred IP addresses. For example, in response to ten consecutive requests, the system may provide the most preferred IP address seven times and the second most preferred IP address three times. Alternatively, other weightings are possible. Preferably, a more preferred IP address is provided more often than a less preferred IP address. Additionally, the weightings can be based on the relative score for providing content in response to requests sent to each of the IP addresses. For example, as the difference in the score for two IP addresses becomes smaller, the difference in the weightings can decrease. In this way, load can be more smoothly shifted from an overloaded server to an alternate server.

Figure 5:
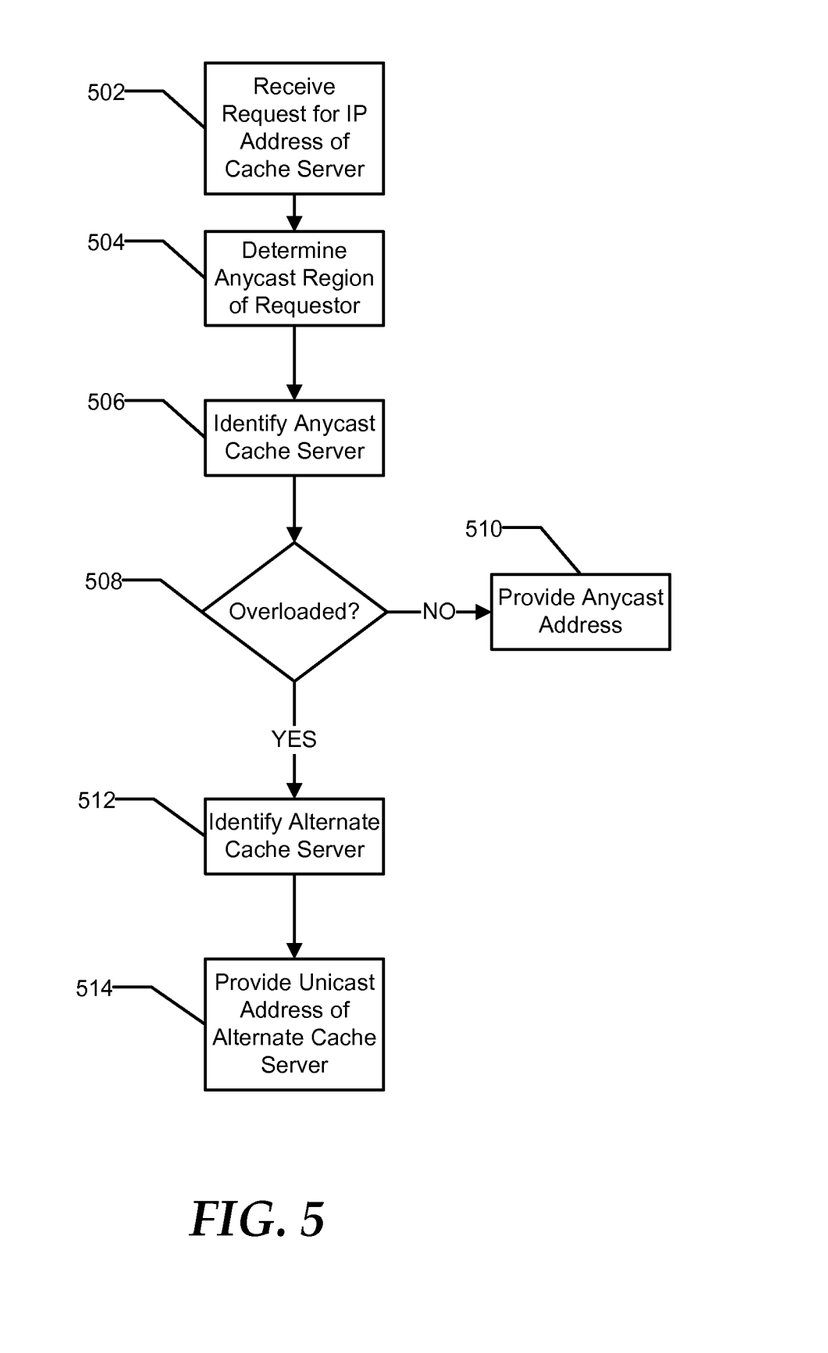
FIG. 5 is a flow diagram illustrating another exemplary method of providing an IP address in accordance with one embodiment of the present disclosure.

FIG. 5 illustrates another exemplary method of providing an IP address in response to a DNS hostname resolution request. At 502, the system can receive a request for an IP address of a cache server. At 504, the system can determine a serving region for the requester. The system may use the source IP address of the request to determine the serving region. At 506, the system can identify the serving region cache server associated with the serving region. The serving region cache server can be the cache server that responds to requests sent to the anycast IP address from client systems within the serving region.

At 508, the system can determine if the serving region cache server is overloaded. The serving region cache server can be overloaded when the load of the serving region cache server exceeds a threshold, such as 90% of the available capacity of the cache server. It should be recognized that other threshold levels are within the scope of this disclosure. Additionally, the threshold may be adjusted based on the variability of the load on the serving region cache server. For example, if the load typically changes by more than 10% over a relatively short time period, the threshold can be decreased to 85% of the available capacity of the cache server.

At 510, when the serving region cache server is not overloaded, the system can provide the anycast IP address in response to the request. Alternatively, at 512, when the serving region cache server is overloaded, the system can identify an alternate cache server. The alternate cache server can be a cache server that has a relatively low network cost for serving content to the serving region. However, the alternate cache server can have a network cost that is higher than the serving region cache server. Additionally, the alternate cache server can be a cache server that is not overloaded. At 514, the system can provide a unicast IP address associated with the alternate cache server in response to the request.

In an embodiment, the alternate cache server may be preselected for the serving region. Alternately, a group of potential alternate cache servers can be preselected based on network cost and the alternate cache server can be selected from the group of potential alternate cache based on the load of each potential alternate cache server.

Figure 6:
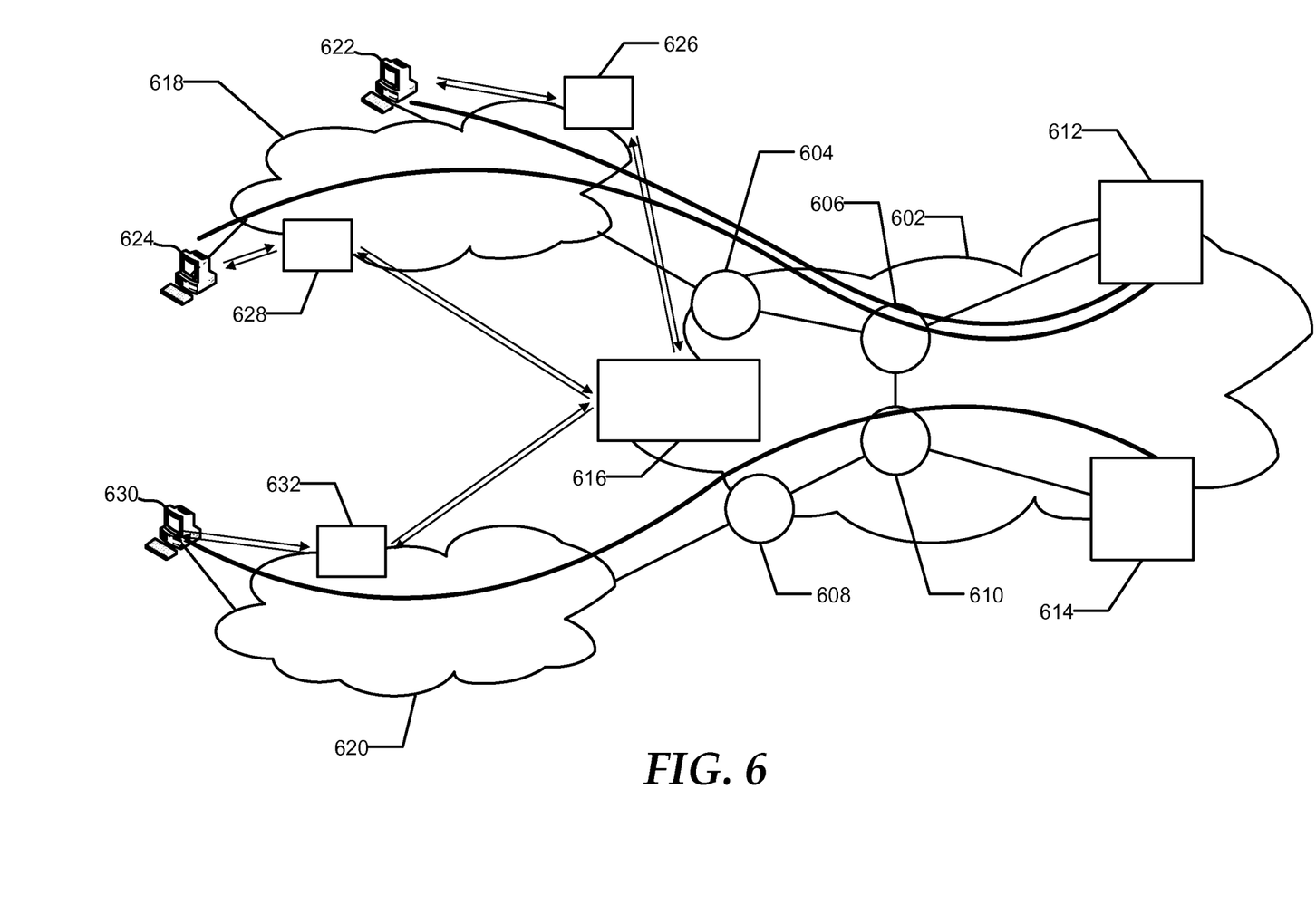
FIGS. 6 and 7 are block diagrams illustrating the behavior of an exemplary anycast CDN system in accordance with one embodiment of the present disclosure.
Figure 7:
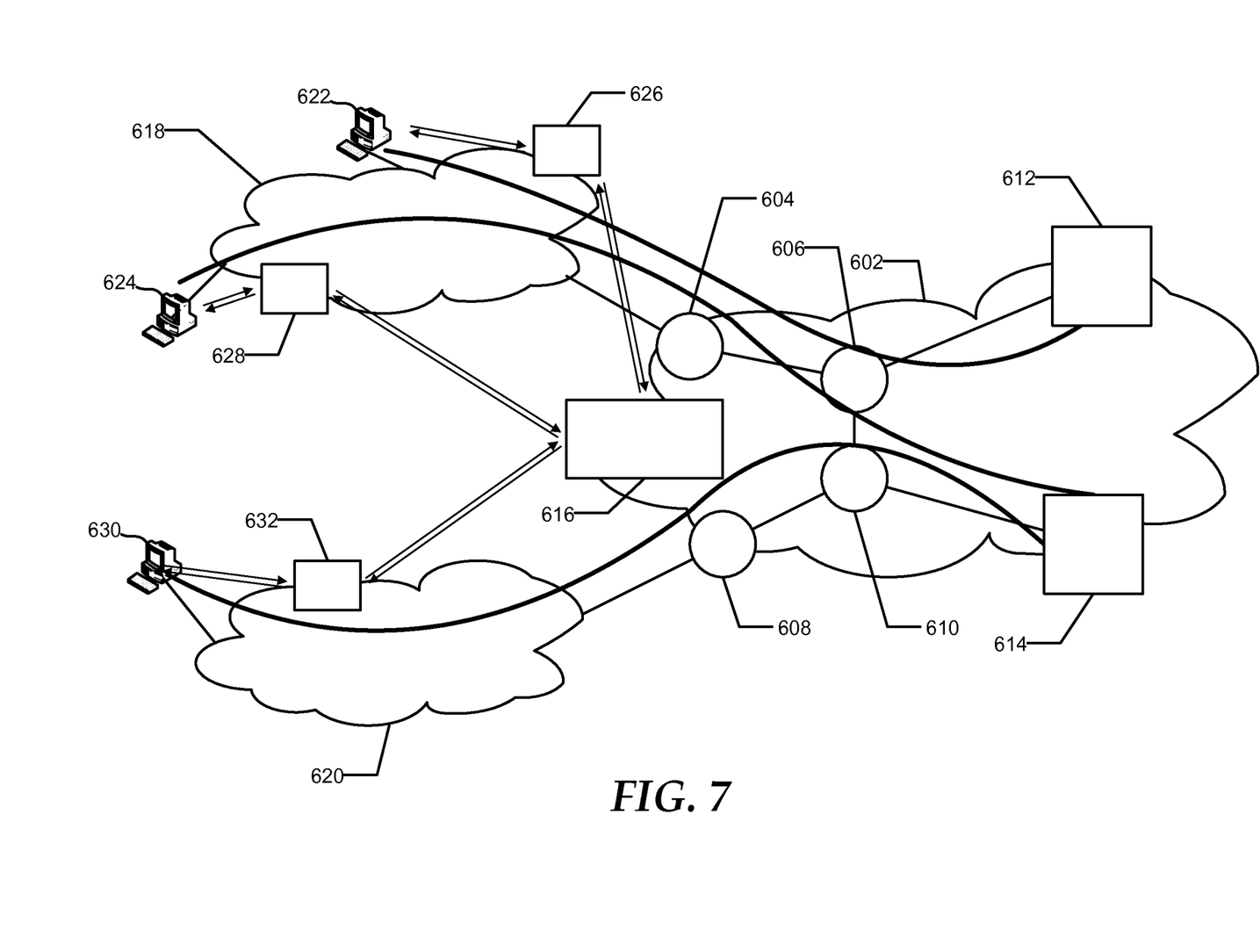

FIGS. 6 and 7 are block diagram illustrating the behavior of an exemplary embodiment of a system 600 during a non-overloaded condition and an overload condition, respectively. Backbone network 602 can includes routers 604, 606, 608, and 610, cache servers 612 and 614, and DNS server 616. Backbone network 602 can be connected to access network 618 through router 604 and to access network 620 through router 608. Access network 618 can include client systems 622 and 624 and local DNS servers 626 and 628. Similarly, access network 620 can include client system 630 and local DNS server 632.

Referring to FIG. 6, during the non-overloaded condition, the preferred IP address for all serving regions is the anycast address. The anycast address allows the routers 604, 606, 608, and 610 to automatically direct traffic to the least cost cache server 612 or 614. Specifically, client system 622 can request an IP address for a cache server from local DNS server 626. Local DNS server 626 can send a request to DNS server 616 for the IP address. DNS server 616 can provide the anycast IP address in response to the query to local DNS server 626, and ultimately to client system 622. Similarly, the anycast IP address can be provided to client systems 624 and 630.

Upon receiving the anycast IP address, client system 622 can send a content request to the anycast IP address. Because client system 622 is within access network 618, corresponding to a first serving region, content requests from client system 622 can be directed along routers 604 and 606 to reach cache server 612. Similarly, content requests from client 624, also located within access network 618, can be directed to cache server 612. Alternatively, content requests from client system 630 can be directed along routers 608 and 610 to cache server 614 as client system 630 is within access network 620 which can belong to a second serving region.

Referring to FIG. 7, when cache server 612 is overloaded, DNS server 616 can provide unicast IP addresses to at least a portion of the requests from the first serving region. Specifically, client system 624 can request an IP address from local DNS server 628. Local DNS server 628 can request an IP address from DNS server 616. DNS server 616, in response to the overload condition at cache server 612, can provide a unicast IP address associated with cache server 614 to local DNS server 628. Requests from client system 624 can then be directed to cache server 614, bypassing the anycast routing and redirecting at least a portion of the traffic from the first serving region away from overloaded cache server 612 to the alternate cache server 614.

Figure 8:
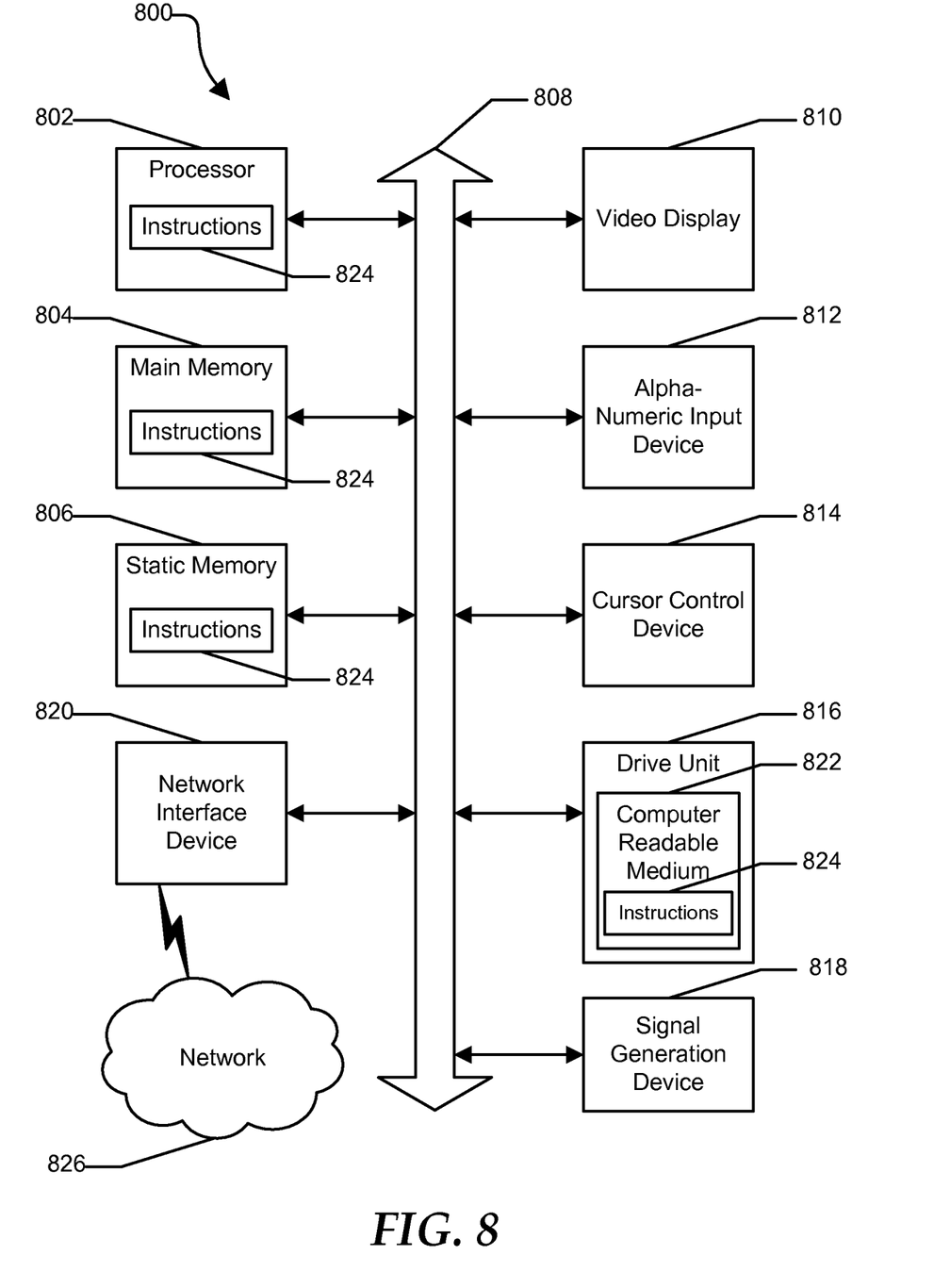
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid-state display, or a cathode ray tube (CRT). Additionally, the computer system 800 may include an input device 812 such as a keyboard, and a cursor control device 814 such as a mouse. Alternatively, input device 812 and cursor control device 814 can be combined in a touchpad or touch sensitive screen. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A domain name server comprising:
   a memory that stores instructions; and
   a processor that executes the instructions to perform operations comprising:
      receiving, at the domain name server, a request from a requestor for an edge cache address, the requestor being part of a serving region;
      identifying, at the domain name server, a first edge cache serving content requests sent to an anycast address from the serving region;
      determining, at the domain name server, a load of the first edge cache;
      providing a unicast address of an alternate edge cache from the domain name server to the requestor in response to the request when the load exceeds a threshold, when a ranking of the unicast address of the alternate edge cache is higher than a ranking of the anycast address, and based on a comparison of a first weighting of the unicast address to a second weighting of the anycast address, wherein the ranking of the unicast address is based on a score of the unicast address that is based on a load of the alternate edge cache, and wherein the ranking of the anycast address is based on a score of the anycast address that is based on the load of the first edge cache; and providing the anycast address from the domain name server to the requestor in response to the request when the load is not greater than the threshold, when the ranking of the anycast address is higher than the ranking of the unicast address of the alternate edge cache, and based on the comparison of the first weighting of the unicast address to the second weighting of the anycast address, wherein a difference between the first weighting of the unicast address and the second weighting of the anycast address decreases as a difference between the score of the unicast address and the score of the anycast address decreases.

2. The domain name server of claim 1 wherein the alternate edge cache is based on one of network distance, network cost, network latency, and link capacity of each of a set of cache servers.

3. The domain name server of claim 1 wherein the alternate edge cache is further based on a load of each of the set of cache servers.

4. The domain name server of claim 1 wherein the alternate edge cache is identified prior to receiving the request.

5. The domain name server of claim 1 wherein the threshold is at least about 85% of the capacity of the first edge cache.

6. The domain name server of claim 1 wherein the load of the first edge cache is based on one of network bandwidth, central processing unit utilization, memory utilization, and number of requests being served.

7. A system comprising:
a first cache server including a first storage medium having instructions that, when executed, cause the first cache server to perform operations comprising:
responding to an anycast address; and
responding to a first unicast address;
a second cache server including a second storage medium having instructions that, when executed, cause the second cache server to perform operations comprising:
responding to the anycast address; and
responding to a second unicast address;
a domain name server, the domain name server including a third storage medium having instructions that, when executed, cause the domain name server to perform operations comprising:
receiving a request from a requestor for a cache server address;
identifying a preferred cache server address from a set of cache server addresses, the set of cache server addresses including the first unicast address, the second unicast address, and the anycast address, the preferred address based on routing of the anycast address and a cost for providing content from each of the first and second cache servers;
determining a ranking for the first unicast address, the second unicast address,. and the anycast address based on a score for the first unicast address, a score of the second unicast address, a score of the anycast address, a first weighting for the first unicast address, a second weighting for the second unicast address, and a third weighting for the anycast address, wherein the score for the first unicast address is based on a load of the first cache server, wherein the score for the second unicast address is based on a load of the second cache server, wherein a difference between the first weighting for the first unicast address and the third weighting for the anycast address decreases as a difference between the score for the first unicast address and the score for the anycast address decreases; and providing the preferred cache server address from the domain name server to the requestor based on the ranking.

8. The system of claim 7 wherein the routing of the anycast addresses directs a content request to the first cache server.

9. The system of claim 8 wherein the preferred address is the second unicast address when the first cache server is overloaded.

10. The system of claim 8 wherein the preferred address is the anycast address when the first cache server is not overloaded.

11. The system of claim 7 wherein the preferred address is further based on the load of each of the first and second cache servers.

12. The system of claim 11 wherein the load of each of the first and second cache server is based on one of network bandwidth, central processing unit utilization, memory utilization, and number of requests being served.

13. The system of claim 7 wherein the cost for providing content includes one of network distance, network cost, network latency, and link capacity.

14. A non-transitory computer readable medium comprising a plurality of instructions, which when loaded and executed by a processor, cause the processor to perform operations comprising:
identifying a plurality of unicast cache servers for a serving region, each unicast cache server responding to one of a plurality of unicast addresses;
determining a serving region cache server for the serving region, the serving region cache server responding to content requests from the serving region sent to an anycast address;
selecting an alternate cache server from the plurality of unicast cache servers;
providing the anycast address from a domain name server to a requestor when a load of the serving region cache server does not exceed a threshold, when a ranking of the anycast address is higher than a ranking of the unicast address of the alternate cache server, and based on a comparison of a first weighting of the unicast address to a second weighting of the anycast address; and
providing the unicast address of the alternate cache server from the domain name server to the requestor when the load of the serving region cache server exceeds the threshold and when the ranking of the unicast address is higher than the ranking of the anycast address, wherein the ranking of the unicast address is based on a score of the unicast address that is based on a load of the alternate cache server, wherein the ranking of the anycast address is based on a score of the anycast address that is based on the load of the serving region cache server, and wherein a difference between the first weighting of the unicast address and the second weighting of the anycast address decreases as a difference between the score of the unicast address and the score of the anycast address decreases.

15. The non-transitory computer readable medium of claim 14 wherein the serving region includes client systems sharing a common ingress point.

16. The non-transitory computer readable medium of claim 14 wherein determining the serving region cache server utilizes routing information of the anycast address for the serving region.

17. The non-transitory computer readable medium of claim 14, wherein the operations further comprise:
   obtaining load information from the serving region cache server; and
   providing the unicast address of the alternate cache server when the serving region cache server is overloaded.

18. The non-transitory computer readable medium of claim 17 wherein the load information includes one of network bandwidth, central processing unit utilization, memory utilization, and number of requests being served.

19. The non-transitory computer readable medium of claim 14 wherein selecting the alternate cache server includes determining a network distance, a network cost, a network latency, and a link capacity between the serving region and each of the plurality of unicast cache servers.

20. The non-transitory computer readable medium of claim 14 wherein selecting the alternate cache server includes determining load information for each of the plurality of unicast cache servers.

* * * * *